(12) United States Patent
Muneda et al.

(10) Patent No.: US 10,723,530 B2
(45) Date of Patent: Jul. 28, 2020

(54) OUTER PACKING MATERIAL FOR VACUUM INSULATION MATERIAL, VACUUM INSULATION MATERIAL, AND ARTICLE PROVIDED WITH VACUUM INSULATION MATERIAL

(71) Applicant: DAI NIPPON PRINTING CO., LTD., Tokyo-to (JP)

(72) Inventors: Taku Muneda, Tokyo-to (JP); Masahiro Imai, Tokyo-to (JP); Yuka Tachikawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/335,827

(22) PCT Filed: Sep. 22, 2017

(86) PCT No.: PCT/JP2017/034360
§ 371 (c)(1),
(2) Date: Jun. 7, 2019

(87) PCT Pub. No.: WO2018/062048
PCT Pub. Date: Apr. 5, 2018

(65) Prior Publication Data
US 2019/0300253 A1 Oct. 3, 2019

(30) Foreign Application Priority Data
Sep. 30, 2016 (JP) .................. 2016-195065

(51) Int. Cl.
*B32B 7/02* (2019.01)
*B65D 65/40* (2006.01)
(Continued)

(52) U.S. Cl.
CPC ............... *B65D 65/40* (2013.01); *B32B 7/02* (2013.01); *F25D 23/06* (2013.01); *F16L 59/02* (2013.01);
(Continued)

(58) Field of Classification Search
CPC . B32B 7/02; B65D 65/40; F16L 59/02; F16L 59/065; F25D 2201/14; F25D 23/06
See application file for complete search history.

(56) References Cited

FOREIGN PATENT DOCUMENTS

| JP | 2006-070923 A | 3/2006 |
| JP | 2008-106532 A | 5/2008 |

(Continued)

OTHER PUBLICATIONS

Kojima (JP 2008106532 A machine translation), Aug. 2008. (Year: 2008).*

(Continued)

*Primary Examiner* — Lawrence D Ferguson
(74) *Attorney, Agent, or Firm* — Oliff PLC (57) ABSTRACT

An outer packing material for vacuum insulation material by having a thermally weldable film and a gas barrier film in this order; wherein the product of the tensile elasticity of the outer packing material for vacuum insulation material and the cube of a thickness of the outer packing material for vacuum insulation material is 3.0 MPa·mm³ or less; and push-in elasticity of the thermally weldable film is 0.8 GPa or more.

10 Claims, 2 Drawing Sheets (51) Int. Cl.
*F25D 23/06* (2006.01)
*F16L 59/02* (2006.01)
*F16L 59/065* (2006.01)

(52) U.S. Cl.
CPC ......... *F16L 59/065* (2013.01); *F25D 2201/14* (2013.01)

(56) References Cited

FOREIGN PATENT DOCUMENTS

| | | |
|---|---|---|
| JP | 2013-103343 A | 5/2013 |
| JP | 2014-129876 A | 7/2014 |
| JP | 2014-228114 A | 12/2014 |

OTHER PUBLICATIONS

Dec. 5, 2017 International Search Report issued in International Patent Application No. PCT/JP2017/034360.

* cited by examiner

OUTER PACKING MATERIAL FOR VACUUM INSULATION MATERIAL, VACUUM INSULATION MATERIAL, AND ARTICLE PROVIDED WITH VACUUM INSULATION MATERIAL

TECHNICAL FIELD

The present disclosure relates to an outer packing material for vacuum insulation material, a vacuum insulation material, and an article provided with the vacuum insulation material.

BACKGROUND ART

The vacuum insulation material comprises a core material and an outer packing material enclosing the core material. Inside a bag body configured by the outer packing material, the core material is disposed, and the pressure therein is kept to be a vacuum state of lower pressure than air pressure. Heat circulation inside the bag body is inhibited thereby, and thus the vacuum insulation material may exhibit excellent heat insulating properties. In order to keep the inside of the vacuum insulation material in the vacuum state, required properties for the outer packing material configured in the vacuum insulation material are such as gas barrier properties to inhibit gas from passing there through, and thermal welding properties for forming the bag body. Accordingly, the outer packing material for vacuum insulation material is generally configured by a gas barrier film and a thermally weldable film (such as in Patent Documents 1 to 3).

CITATION LIST

Patent Documents

Patent Document 1: Japanese Patent Application Laid-Open (JP-A) No. 2006-070923
Patent Document 2: JP-A No. 2008-106532
Patent Document 3: JP-A No. 2013-103343
Patent Document 4: JP-A No. 2008-106532
Patent Document 5: JP-A No. 2013-103343

SUMMARY

Technical Problem

For example, Patent Documents 1 to 3 discloses that the outer packing material may be bent in some cases such as when the vacuum insulation material is produced and when it is used. In the outer packing material for vacuum insulation material, it is desirable that a defect such as a minute crack is not easily generated even when it is bent. The reason therefor is that, if the vacuum insulation material had a minute defect in its outer packing material, the thermal insulation properties would be largely degraded during its usage even when the vacuum insulation properties thereof in the initial state is in the same level as those without the defect.

The objects of the present disclosure are to provide an outer packing material for vacuum insulation material, with which a vacuum insulation material capable of maintaining excellent thermal insulation properties, and to provide a vacuum insulation material and an article provided with the vacuum insulation material capable of maintaining excellent thermal insulation properties.

Solution to Problem

In order to achieve the objects, the present disclosure provides an outer packing material for vacuum insulation material characterized by comprising a thermally weldable film and a gas barrier film in this order; wherein the product of the tensile elasticity of the outer packing material for vacuum insulation material and the cube of a thickness of the outer packing material for vacuum insulation material is 3.0 $MPa \cdot mm^3$ or less; and push-in elasticity of the thermally weldable film is 0.8 GPa or more.

The present disclosure provides a vacuum insulation material characterized by comprising a core material, and an outer packing material for vacuum insulation material enclosing the core material; wherein the outer packing material for vacuum insulation material is the above described outer packing material for vacuum insulation material.

The present disclosure provides an article provided with vacuum insulation material characterized by comprising an article including a thermal insulation region, and a vacuum insulation material; wherein the vacuum insulation material includes a core material, and an outer packing material for vacuum insulation material enclosing the core material; and the outer packing material for vacuum insulation material is the above described outer packing material for vacuum insulation material.

Advantageous Effects

The present disclosure provides the outer packing material for vacuum insulation material, with which a vacuum insulation material capable of maintaining excellent thermal insulation properties can be produced. Also, the vacuum insulation material and an article provided with the vacuum insulation material can be provided.

DESCRIPTION OF EMBODIMENTS

An embodiment of the present disclosure is explained as below with reference to, for example, drawings. However, the present disclosure is enforceable in a variety of different forms, and thus should not be taken as is limited to the contents described in the embodiment exemplified as below. Also, the drawings may show the features of the invention such as width, thickness, and shape of each part schematically in order to explain the invention more clearly in some cases comparing to the actual form; however, it is merely an example, and thus does not limit the interpretation of the present disclosure. Also, in the specification and each drawing, for the factor same as that described in the figure already explained, the same reference sign is indicated and the explanation thereof may be omitted.

The present disclosure relates to an outer packing material for vacuum insulation material, a vacuum insulation material using thereof, and an article provided with the vacuum insulation material. Incidentally, in the explanation below, "outer packing material for vacuum insulation material" may be referred to as just "outer packing material" in some cases. Also, in the outer packing material, the position near the inside of the vacuum insulation material when the vacuum insulation material is produced may be referred to as "inner side of outer packing material", the position far therefrom may be referred to as "outer side of outer packing material" in some cases.

A. Outer Packing Material for Vacuum Insulation Material

The outer packing material for vacuum insulation material of the present disclosure is an outer packing material for vacuum insulation material characterized by comprising a thermally weldable film and a gas barrier film in this order; wherein the product of the tensile elasticity of the outer packing material for vacuum insulation material and the cube of a thickness of the outer packing material for vacuum insulation material is 3.0 MPa·mm$^3$ or less; and push-in elasticity of the thermally weldable film is 0.8 GPa or more. Incidentally, in the explanation below, the function described as the product of the tensile elasticity of the outer packing material for vacuum insulation material and the cube of a thickness of the outer packing material for vacuum insulation material may be called as "function M" in some cases.

Figure 1:
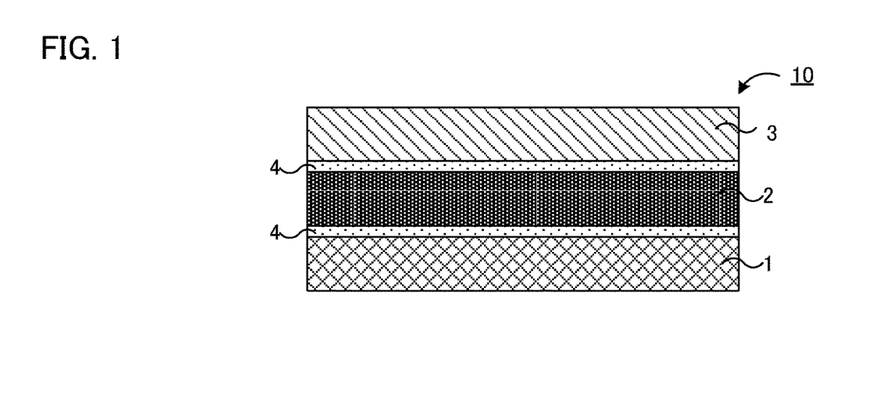
FIG. 1 is a schematic cross-sectional view illustrating an example of outer packing material for vacuum insulation material of the present disclosure.

FIG. 1 is a schematic cross-sectional view illustrating an example of the outer packing material for vacuum insulation material of the present disclosure. In outer packing material for vacuum insulation material 10 in FIG. 1, thermally weldable film 1, gas barrier film 2, and protection film 3 are disposed in this order using adhesive 4, the value of function M is 3.0 MPa·mm$^3$ or less, and the push-in elasticity of the thermally weldable film is 0.8 GPa or more.

Figure 2:
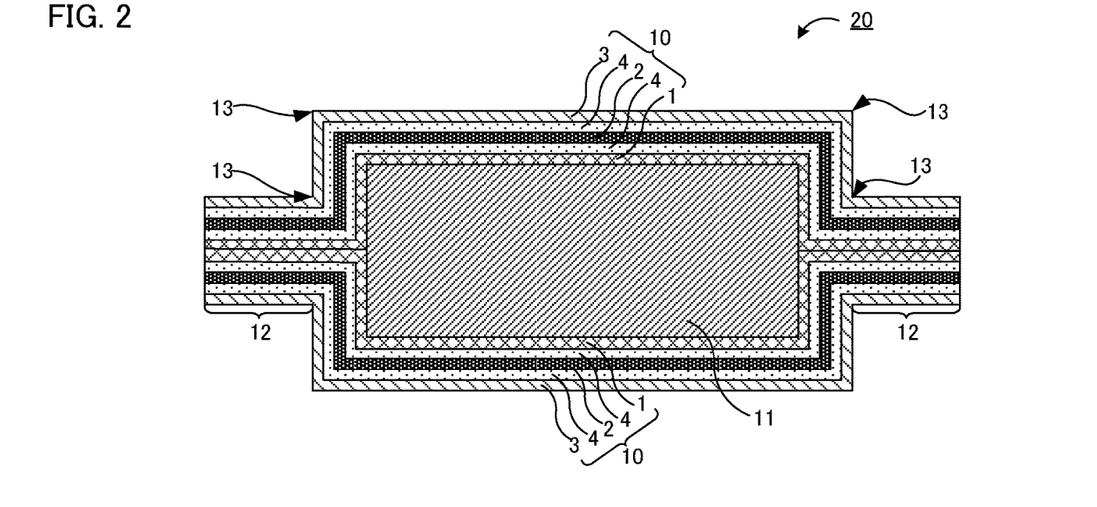
FIG. 2 is a schematic cross-sectional view illustrating an example of the vacuum insulation material of the present disclosure.

FIG. 2 is a schematic cross-sectional view illustrating an example of the vacuum insulation material produced using the outer packing material of the present disclosure. Vacuum insulation material 20 in FIG. 2 comprises core material 11, and outer packing material 10 enclosing core material 11. Outer packing material 10 is in a form of a bag body such that the edges 12 of inner side of each outer packing material 10 are adhered. Inside the bag body configured by outer packing material 10, core material 11 is disposed, and the pressure is kept in a vacuum state of lower pressure than air pressure. At the base part of edges 12 at core material 11 side in outer packing material 10, and the corner part of packing material 10 where packing material 10 overs the corner of core material 11, bent part 13, which is a part where outer packing material 10 is bent, is present. A tensile stress or/and a compressive stress are applied to bent part 13, and it may easily cause a minute defect.

Figure 3:
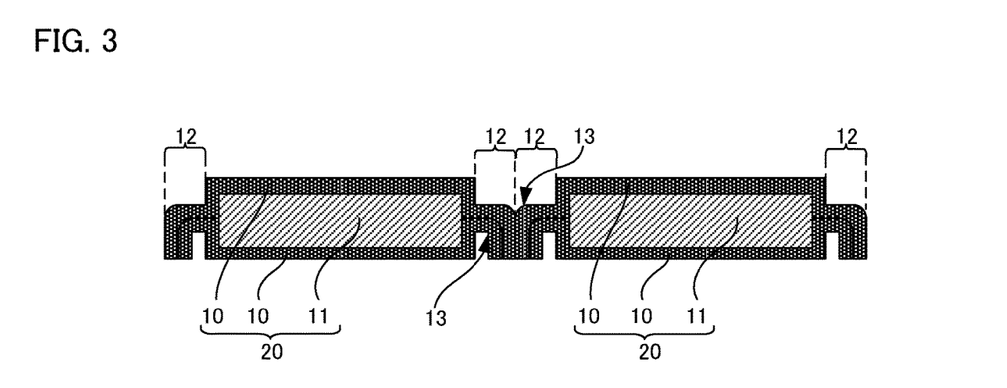
FIG. 3 is an explanatory view showing the vacuum insulation material of the present disclosure in a used state.

FIG. 3 is an explanatory view showing the vacuum insulation material produced using the outer packing material of the present disclosure in a used state. In the used state in FIG. 3, a plurality of vacuum insulation materials 20 are disposed in line, and edges 12 are bent to reduce the region occupied by edges 12 having low heat insulating properties. In edges 12, bent part 13, where a minute defect is easily generated, is present.

In the outer packing material of the present disclosure, even with the part bent as like bent part 13, a defect such as a minute crack is not easily generated in the gas barrier film, and thus the vacuum insulation material capable of maintaining excellent heat insulating properties can be obtained therewith.

In the outer packing material of the present disclosure, the value of function M being 3.0 MPa·mm$^3$ or less inhibits the generation of a minute crack especially at the part bent in the outer packing material. The reason therefor is presumed as follows.

In general, when an object has a characteristic of tensile elasticity E and a shape of a rectangular parallelepiped with width d and thickness h, and the position where stress F is applied is the position from the edge supporting the object in the rectangular parallelepiped shape to distance L, deformation volume v when stress F is applied to the object is represented by $v=4FL^3/(bEh^3)$. Meanwhile, function M, that is the product of tensile elasticity E of the outer packing material and the cube of thickness h of the outer packing material, is represented by $M=Eh^3$; thus, deformation volume v is in inverse proportion to function M. When the smaller the value of function M is, the larger the modification volume becomes when the same stress is applied; thus, the value of function M is an index for the softness of the outer packing material. Accordingly, the outer packing material with the value of function M being the specific value or less has flexibility in a specific level or more. Incidentally, likewise, it can be also said that the value of function M may be an index for the hardness of the outer packing material; the outer packing material with the value of function M being the specific value or more has rigidity in a specific level or more.

Figure 4A:
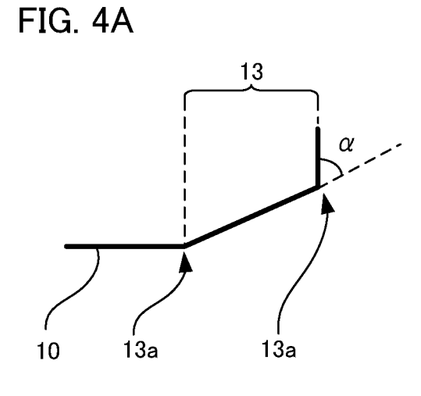
FIGS. 4A and 4B are explanatory views explaining the bent state at the bent part.
Figure 4B:
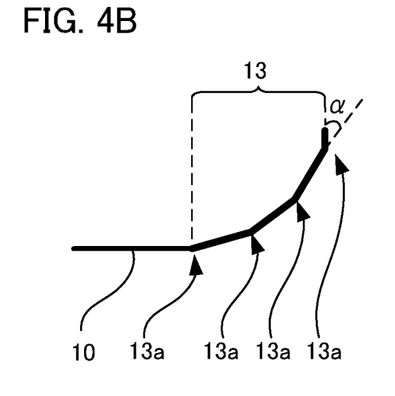

The minute crack in the gas barrier film is considered to occur in occasions such as when a strong stress is applied to the point where the strength of the gas barrier film is degraded due to the presence of a minute dent and a minute foreign substance. When the value of function M exceeds the specific value and the outer packing material is hard, the outer packing material may not be bent unless applying a strong stress, but the strong stress easily causes a crack in the gas barrier film. On the other hand, when the value of function M is the specific value or less and the outer packing material is soft, the outer packing material may be bent with a small stress; thus, the stress applied to the gas barrier film becomes small and the crack is not easily generated. Also, when the value of function M is the specific value or less and the outer packing material is soft, the stress spreads to a plurality of points to cause bent in many points; thus, the number of the bent points formed in bent part with the value of function M being the specific value or less becomes more than that with the value of function M being large. As shown in FIGS. 4A and 4B, compared to when bent points 13a in bent part 13 is little (FIG. 4A), when bent points 13a in bent part 13 is much (FIG. 4B), angle α at each bent point 13a is small; thus, the stress applied to the gas barrier film in each of the bent part becomes small to inhibit the generation of cracks.

In the outer packing material of the present disclosure, the value of function M being 3.0 MPa·mm$^3$ or less as well as push-in elasticity of the thermally weldable film being 0.8 GPa or more, may inhibit the generation of a minute crack especially at the part bent in the outer packing material. The reason therefor is presumed as follows.

For the gas barrier film, a material with comparatively high push-in elasticity is often used in a fixed thickness in order to secure certain gas barrier properties. When the outer packing material including such a gas barrier film is bent, a relatively high stress among the stress applied to the outer packing material is applied to the gas barrier film to presumably easily cause the crack of the gas barrier film. Then, by using thermally weldable film with push-in elasticity of 0.8 GPa or more, the stress applied to the gas barrier film in the outer packing material may be spread also to the thermally weldable film and thus the stress applied to the gas barrier film may be relatively decreased. Accordingly, in the outer packing material of the present disclosure, it can be presumed that the value of function M being 3.0 MPa·mm$^3$ or less as well as push-in elasticity of the thermally weldable film being 0.8 GPa or more, may inhibit the generation of a minute crack at the part bent in the outer packing material.

Incidentally, setting the push-in elasticity of the thermally weldable film to 0.8 GPa or more is presumably more practical when a protection film is disposed at the opposite side surface to the thermally weldable film in the gas barrier film. For the protection film, a material with comparatively high push-in elasticity is often used in order to secure the resistance to outer force. When the outer packing material is folded, if the difference in the push-in elasticity of the film used between the inner side and the outer side was too large, the balance of stress between the inner side and the outer side of the outer packing material would be lost to presumably easily cause the crack of the gas barrier film. Then, it can be presumed that, by using the material with comparatively high pus-in elasticity is used as the thermally weldable film disposed at the opposite side surface to the protection film in the gas barrier film, the balance of the stress between the inner side and the outer side of the outer packing material is restored and the stress applied to the outer packing material is spread to inhibit the generation of the crack at the part bent in the outer packing material.

The outer packing material of the present disclosure is an outer packing material for vacuum insulation material characterized by comprising a thermally weldable film and a gas barrier film in this order; wherein the product of the tensile elasticity of the outer packing material for vacuum insulation material and the cube of a thickness of the outer packing material for vacuum insulation material is 3.0 MPa·mm$^3$ or less; and push-in elasticity of the thermally weldable film is 0.8 GPa or more.

(1) Characteristics of Outer Packing Material for Vacuum Insulation Material

The value of function M of the outer packing material for vacuum insulation material is 3.0 MPa·mm$^3$ or less.

There are no particular limitations on the value of function M of the outer packing material for vacuum insulation material; for example, it may be 0.5 MPa·mm$^3$ or more, may be 0.7 MPa·mm$^3$ or more, may be 0.8 MPa·mm$^3$ or more, may be 0.9 MPa·mm$^3$ or more, may be 1.0 MPa·mm$^3$ or more, may be 1.1 MPa·mm$^3$ or more, may be 1.4 MPa·mm$^3$ or more, and may be 1.5 MPa·mm$^3$ or more. Also, the upper limit of the function M of the outer packing material for vacuum insulation material may be set to a preferable value as long as it is 3.0 MPa·mm$^3$ or less. For example, the function M of the outer packing material for vacuum insulation material may be 2.8 MPa·mm$^3$ or less, may be 2.5 MPa·mm$^3$ or less, may be 2.0 MPa·mm$^3$ or less, and may be 1.9 MPa·mm$^3$ or less. Accordingly, in consideration of the above described effects, the function M of the outer packing material for vacuum insulation material may be in the range of an arbitrary combination of the upper limit and the lower limit; for example, it may be in a range of 0.5 MPa·mm$^3$ or more and 3.0 MPa·mm$^3$ or less, in a range of 0.5 MPa·mm$^3$ or more and 2.5 MPa·mm$^3$ or less, in a range of 0.5 MPa·mm$^3$ or more and 2.0 MPa·mm$^3$ or less, in a range of 0.7 MPa·mm$^3$ or more and 3.0 MPa·mm$^3$ or less, in a range of 0.7 MPa·mm$^3$ or more and 2.5 MPa·mm$^3$ or less, in a range of 0.7 MPa·mm$^3$ or more and 2.0 MPa·mm$^3$ or less, in a range of 1.0 MPa·mm$^3$ or more and 3.0 MPa·mm$^3$ or less, in a range of 1.0 MPa·mm$^3$ or more and 2.5 MPa·mm$^3$ or less, and in a range of 1.0 MPa·mm$^3$ or more and 2.0 MPa·mm$^3$ or less.

There are no particular limitations on the tensile elasticity of the outer packing material as long as it allows the value of function M to be in the specific range; for example, it may be 5.0 GPa or less, may be 4.0 GPa or less, and may be 3.5 GPa or less, and also, it may be 1.0 GPa or more, may be 1.2 GPa or more, and may be 1.5 GPa or more. The tensile elasticity of the outer packing material may be adjusted in accordance with factors such as the kind and the number of each film and adhesive configured in the outer packing material. The value of the tensile elasticity of the film and the adhesive varies with factor such as the material and the blending ratio of the main component and the subcomponent, or production conditions such as processing to be a film.

In the present disclosure, the measurement method of the tensile elasticity is based on JIS K7161-1:2014 (Plastic-Method to determine tensile elasticity—Part 1: General Rules); the method used is to measure the tensile elasticity using a tension tester in the conditions of the distance between zips of 100 mm, the tension rate of 100 mm/min., and with the usage of reserve force, after collecting a sample of the outer packing material by cutting thereof in a rectangular shape having a width of 15 mm. The measurement environment is the environment at 23° C. and the humidity of 55%. The length of the sample is determined in the range grips can be attached so that the length of the sample matches to the axis of the tester ad the part of grips is not shifted during the measurement; for example, the length is approximately 120 mm. The tension tester is preferably Instron5565 (from Instron Japan). The reserve force is, for example, when the stress is $\sigma_0$, and the elasticity is $E_t$ (when the appropriate elasticity and stress for the reserve force are not clear, the predictive values of the elasticity and the stress should be determined by a test in advance), in a range of $(E_t/10000) \leq \sigma_0 \leq (E_t/3000)$. In one condition, at least 5 pieces of the sample are measured and the average of these measured values is regarded as the value of elasticity in that condition. Incidentally, the value of the tensile elasticity may vary with the directions in the surface of the outer packing material in some cases, and thus the usage of the average value in the surface is preferable. The average value in the surface of the outer packing material may be the average of the values collected in 8 conditions in which the value is respectively measured in the condition of the direction in the surface of the outer packing material being changed every 22.5° approximately.

There are no particular limitations on the thickness of the outer packing material as long as it allows the value of function M to be in the specific range; for example, it may be 200 μm or less, may be 150 μm or less, and also, for example, may be 30 μm or more, and may be 50 μm or more.

(2) Thermally Weldable Film

The thermally weldable film is disposed at the inner side of the outer packing material than the gas barrier film, and usually disposed at the innermost of the outer packing material in many cases. The thermally weldable films are thermally welded to each other on the occupation of producing the vacuum insulation material, and thus the outer packing materials are bonded to each other.

The push-in elasticity of the thermally weldable film is 0.8 GPa or more. The occurrence of a minute crack at the part bent in the outer packing material may be inhibited. In order to inhibit the occurrence of the minute crack more, the push-in elasticity of the thermally weldable film may be 1.3 GPa or more. Also, the push-in elasticity of the thermally weldable film may be 10 GPa or less, and may be 5 GPa or less. Incidentally, usually, the thermally weldable film is disposed at the innermost of the outer packing material; thus, the surface of the inner side of the outer packing material is equal to the surface of the thermally weldable film. Accordingly, the push-in elasticity of the thermally weldable film is determined by measuring the surface of the inner side of the outer packing material or the cross section of the outer packing material.

In more specific, the lower limit of the push-in elasticity of the thermally weldable film may be set to be more preferable value as long as it is 0.8 GPa or more. For example, the push-in elasticity of the thermally weldable film may be 0.9 GPa or more, may be 1.0 GPa or more, may be 1.7 GPa or more, may be 2.1 GPa or more, may be 2.5 GPa or more, and may be 2.7 GPa or more. Also, there are no particular limitations on the upper limit of the push-in elasticity of the thermally weldable film. For example, the push-in elasticity of the thermally weldable film may be 10 GPa or less, may be 7.0 GPa or less, may be 5.0 GPa or less, and may be 3.0 GPa or less. Thus, the push-in elasticity of the thermally weldable film may be in the range of an arbitrary combination of the upper limit and the lower limit in consideration of the above described effect; for example, it may be in the ranges such as, in a range of 0.8 GPa or more and 10 GPa or less, in a range of 0.8 GPa or more and 5.0 GPa or less, in a range of 0.8 GPa or more and 3.0 GPa or less, in a range of 0.9 GPa or more and 10 GPa or less, in a range of 0.9 GPa or more and 5.0 GPa or less, in a range of 0.9 GPa or more and 3.0 GPa or less, in a range of 1.7 GPa or more and 10 GPa or less, in a range of 1.7 GPa or more and 5.0 GPa or less, in a range of 1.7 GPa or more and 3.0 GPa or less, in a range of 2.0 GPa or more and 10 GPa or less, in a range of 2.0 GPa or more and 5.0 GPa or less, and in a range of 2.0 GPa or more and 3.0 GPa or less.

The measurement of the push-in elasticity is based on ISO 14577, to the cross section or the surface of the sample, using a method to measure the push-in elasticity with an ultramicro tolerance and hardness testing machine wherein a Vickers indenter (diamond indenter in square pyramid having angle between the opposite surface of 136°) is installed, in the environment of approximately 23° C. and approximately 60% RH. The measurement is conducted with the push-in speed of 0.1 μm/second, the push-in depth of 2 μm, keeping time of 5 seconds, and pulling-out speed of 0.1 μm/second. The ultramicro hardness testing machine is preferably PICODENTOR™ HM500 (from FISCHER INSTRUMENTS K.K.). In one condition, at least 5 pieces of the sample are measured, and the average of the measured values is regarded as the value of the push-in elasticity in that condition. On the occasion of measuring the cross section of the sample, the outer periphery of the sample is solidified with a curing resin-based adhesive, and fixed, and the fixed sample is cut in the thickness direction with a diamond knife to measure the cross section of the sample exposed. Also, on the occasion of measuring the surface of the sample, one side of the surfaces of the sample not to be measured is fixed to a flat glass plate having the thickness of 1.1 mm with curing resin-based adhesive to measure the surface of the sample.

The main component of the material of the thermally weldable film is, for example, for the reason it can be melted and fused by heating, materials such as a thermoplastic resin and a hot melt resin may be used. Specific examples thereof may include polypropylene such as unstretched polypropylene (CPP), a polyolefin-based resin such as cyclopolyolefin, a polyester-based resin such as polyethylene terephthalate (PET), polyethylene naphthalate (PEN), and polybutylene terephthalate (PBT), a polyamide-based resin such as a polyvinyl acetate-based resin, a polyvinyl chloride-based resin, a poly(meth)acrylic resin, an urethane resin, and nylon, and polyvinyl alcohol such as polyvinyl alcohol (PVA) and ethylene-vinyl alcohol copolymer (EVOH). For the reasons that high push-in elasticity with excellent adhesive force may be obtained, the polyolefin-based resin of cyclopolyolefin, as well as the polyester-based resin of polyethylene terephthalate, polyethylene naphthalate, and polybutylene terephthalate may be used. Also, for the thermally weldable film, an unstretched film may be used.

The thermally weldable film may include an additional material such as an anti-blocking agent, a lubricant, a flame retardant, and a filler material, other than the above described resin.

There are no particular limitations on the melting temperature of the thermally weldable film; however, to improve the thermal weldability, for example, it may be 80° C. or more, may be 100° C. or more, and also, may be 300° C. or less, and may be 250° C. or less.

For the method for measuring the melting temperature, the measurement of (Tm) is based on JIS K7121:2012 (method for measuring transition temperature of plastic), and a method to determine the fusing temperature by measuring a DSC curve using a differential scanning calorimetry (DSC) measurement device, is used. Approximately 10 mg of the sample was collected, put in a container made of aluminum, and installed to the device. The measurement of the DSC curve is carried out by rising the temperature from the starting temperature of 20° C. to 250° C. at the temperature rising speed of 10° C./minute, keeping 250° C. for 10 minutes, and dropping the temperature from 250° C. to 20° C. at the cooling speed of 10° C./minute. The fusing temperature is determined from the DSC curve during temperature rising. The DSC device is preferably DSC204 (from NETZSCH).

There are no particular limitations on the thickness of the thermally weldable film; however, to improve the thermal weldability, for example, it may be 20 μm or more, may be 25 μm or more, may be 30 μm or more, and also, may be 100 μm or less, may be 90 μm or less, and may be 80 μm or less.

(3) Gas Barrier Film

The gas barrier film is disposed at the outer side of the outer packing material than the thermally weldable film, and inhibits gas from permeating to inside the vacuum insulation material from outside, as a barrier to the gas such as oxygen and water vapor.

Examples of the gas barrier film may include a gas barrier film having a meatal foil, and a gas barrier film including a resin substrate and a gas barrier layer containing an inorganic compound disposed at one or both surfaces of the resin substrate.

The metal foil used in the gas barrier film including a metal foil is generally a metal thinly stretched. The metal foil may produced by, for example, strip processing. Examples of the metal foil may include aluminum, nickel, stainless, iron, copper, and titanium. The metal foil has excellent gas barrier properties and has excellent flex resistance and stab resistance. Further, an aluminum foil is easily processed and inexpensive. The gas barrier film including the metal foil may be configured by just the metal foil, may be configured by a plurality of the metal foil, and an additional layer may be layered to the metal foil.

There are no particular limitations on the thickness of the gas barrier film including the metal foil; for example, it may be 9 µm or less, may be 7 µm or less, and for example, may be 4 µm or more, and may be 5 µm or more.

There are no particular limitations on the oxygen permeability of the gas barrier film including the metal foil; it may be 0.1 cc/($m^2$·day·atm) or less, and may be 0.01 cc/($m^2$·day·atm) or less. Gas such as oxygen may be inhibited from permeating to inside the vacuum insulation material from outside to inhibit the vacuum degree inside the vacuum insulation material from being degraded.

Incidentally, in the present disclosure, the measurement method used for the measurement of the oxygen permeability is based on JIS K7126-2A:2006 (Plastic-film and sheet-gas permeability test method-Section 2: Isopiestic method, Annex A: oxygen gas permeability test method by an electrolysis sensor method), in the conditions of temperature at 23° C. and humidity of 60% RH, using an oxygen permeability measurement device, and the outer side of the outer packing material (the side where the gas barrier film of the thermally weldable film is disposed) is arranged to contact oxygen gas in the condition of permeating area of 50 $cm^2$. The oxygen permeability measurement device is preferably OXTRAN (OXTRAN2/21 10× from the U.S. MOCON). Regarding test gas, dry oxygen of at least 99.5% is used, after purging for 60 minutes or more at the carrier gas flowing speed of 10 cc/minutes, the test gas is flowed. The measurement is begun after securing 12 hours as the time from letting the test gas flow to reach to the equilibrium state. In one condition, at least 3 pieces of the sample are measured and the average of these measured values is regarded as the value of oxygen permeability in that condition.

There are no particular limitations on the water vapor permeability of the gas barrier film including the metal foil; it may be 0.1 g/($m^2$·day) or less, and may be 0.01 g/($m^2$·day) or less. Gas such as water vapor may be inhibited from permeating to inside the vacuum insulation material from outside to inhibit the vacuum degree inside the vacuum insulation material from being degraded.

Incidentally, in the present disclosure, the measurement method used for the measurement of the water vapor permeability is based on JIS K7129:2008 (Plastic-film and sheet-method to determine water vapor permeability (measurement method with device), Annex B: infrared ray sensor method), in the conditions of a temperature of 40° C. and a humidity of 90% RH (condition 3), using a water vapor permeability measurement device, and the outer side of the outer packing material (the side where the gas barrier film of the thermally weldable film is disposed) is arranged so as to be a high humidity side (water vapor supplying side) in the condition of permeating area of 50 $cm^2$. The water vapor permeability measurement device is preferably PERMATRAN (PERMATRAN-3/33G+ from U.S. MOCON). NIST film #3 is used as a standard test piece. In one condition, at least 3 pieces of the sample are measured and the average of these measured values is regarded as the water vapor permeability in that condition.

The gas barrier layer in the gas barrier film including the resin substrate and the gas barrier layer is generally the layer of an inorganic compound is layered to the resin substrate. The layer of the inorganic compound may be produced by, for example, vapor deposition and pasting. Examples of the inorganic compound may include aluminum, aluminum oxide (alumina), and silicon oxide (silica). Examples of the material for the main component of the resin substrate ma include a polyolefin-based resin such as polyethylene, polypropylene, and cycloolefin, a polyester-based resin such as polyethylene terephthalate (PET), polyethylene naphthalate (PEN), and polybutylene terephthalate (PBT), a polyamide-based resin such as nylon, and polyvinyl alcohol such as polyvinyl alcohol (PVA) and ethylene-vinyl alcohol copolymer (EVOH). The gas barrier film including the resin substrate and the gas barrier layer may inhibit the insulation properties from being degraded due to a heat bridge effect since the thickness of the gas barrier layer may be comparatively made thin. The gas barrier film including the resin substrate and the gas barrier layer may have a plurality of the gas barrier layer, and an additional layer other than the gas barrier layer may be layered thereto.

There are no particular limitations on the thickness of the gas barrier layer in the gas barrier film including the resin substrate and the gas barrier layer; for example, it may be 5 nm or more, may be 10 nm or more, and also, for example, it may be 1000 nm or less, and may be 700 nm or less.

There are no particular limitations on the thickness of the resin substrate in the gas barrier film including the resin substrate and the gas barrier layer; for example, it may be 6 µm or more, may be 9 µm or more, and also, for example, it may be 200 µm or less, and may be 100 µm or less.

There are no particular limitations on the oxygen permeability of the gas barrier film including the resin substrate and the gas barrier layer; for example, it may be 1.0 cc/($m^2$·day·atm) or less, may be 0.6 cc/($m^2$·day·atm) or less, and may be 0.1 cc/($m^2$·day·atm) or less. Gas such as oxygen may be inhibited from permeating to inside the vacuum insulation material from outside to inhibit the vacuum degree inside the vacuum insulation material from being degraded.

There are no particular limitations on the water vapor permeability of the gas barrier film including the resin substrate and the gas barrier layer; it may be 1.0 g/($m^2$·day) or less, may be 0.6 g/($m^2$·day) or less, and may be 0.1 g/($m^2$·day) or less. Gas such as water vapor may be inhibited from permeating to inside the vacuum insulation material from outside to inhibit the vacuum degree inside the vacuum insulation material from being degraded.

There are no particular limitations on the method for forming the gas barrier layer in the resin substrate, and a known method may be used. Examples may include a physical vapor deposition (PVD) method such as a vacuum vapor deposition method, a dry film forming method such as a chemical vapor deposition (CVD) method, a wet film forming method such as a pasting method, and a transferring method of transferring the gas barrier layer to the resin substrate from another substrate.

(4) Protection Film

The outer packing material may include a protection film. The protection film is disposed at the opposite side to the thermally weldable film of the gas barrier film, and protects the outer side of the as barrier film. Incidentally, the protection film may be distinguished from the gas barrier film on the point that no layer including gas barrier properties is disposed at any surfaces.

Examples of the material for the main component of the protection film may include a polyester-based resin such as polyethylene terephthalate (PET), polyethylene naphthalate (PEN), and polybutylene terephthalate (PBT), and a polyamide-based resin such as nylon.

There are no particular limitations on the thickness of the protection film; for example, it may be 5 µm or more, may be 10 µm or more, and also, may be 200 µm or less, and may be 100 µm or less.

There are no particular limitations on the push-in elasticity of the protection film; for example, it may be 0.8 GPa or more, may be 1.3 GPa or more, and also, may be 10 GPa or less, and may be 5 GPa or less. The range being the same as that of the thermally weldable film allows the stress in the inner side and the outer side of the outer packing material to be balanced to disperse the stress applied to the outer packing material, and thus the generation of a crack at the part bent in the outer packing material may be inhibited.

(5) Intermediate Film

The outer packing material may include an intermediate film. The intermediate film is disposed between the gas barrier film and the thermally weldable film, and protects the inner side of the gas barrier film. Also, to set the value of function M to be the specific level or more, increasing the tensile elasticity and the thickness of the thermally weldable film may be considered; however, thermal weldability may be degraded in some cases when these value are increased in the thermally weldable film. Then, inclusion of the intermediate film may allow the value of function M to improve without degrading the thermal weldability of the thermally weldable film. Incidentally, the intermediate film may be distinguished from the gas barrier film on the point that no layer including gas barrier properties is disposed at any surfaces.

Figure 5:
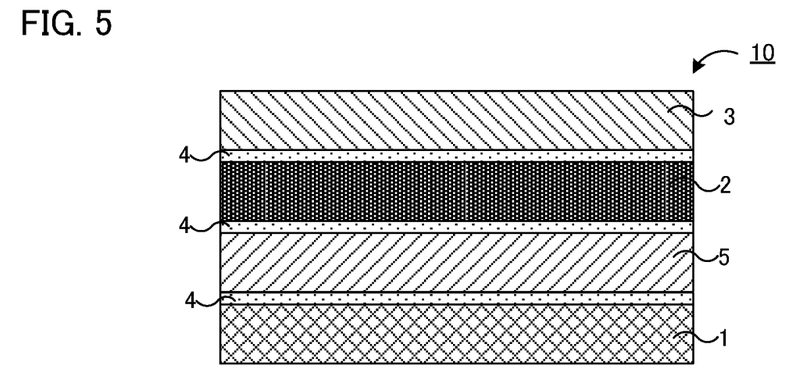
FIG. 5 is a schematic cross-sectional view illustrating an additional example of the outer packing material for vacuum insulation material of the present disclosure.

FIG. 5 is a schematic cross-sectional view illustrating an additional example of the outer packing material for vacuum insulation material of the present disclosure. In outer packing material for vacuum insulation material 10 in FIG. 5, intermediate film 5 is disposed between thermally weldable film 1 and gas barrier film 2.

Examples of the material for the main component of the intermediate film may include a polyolefin-based resin such as polyethylene, polypropylene, and cycloolefin, a polyester-based resin such as polyethylene terephthalate (PET), polyethylene naphthalate (PEN), and polybutylene terephthalate (PBT), a polyamide-based resin such as nylon, and polyvinyl alcohol such as polyvinyl alcohol (PVA) and ethylene-vinyl alcohol copolymer (EVOH).

There are no particular limitations on the thickness of the intermediate film; for example, it may be 5 μm or more, may be 10 μm or more, and also, may be 200 μm or less, and may be 100 μm or less.

(6) Outer Packing Material for Vacuum Insulation Material

The outer packing material comprises at least one thermally weldable film and at least one gas barrier film. It may comprise an additional film such as at least one protection film and at least one intermediate film.

In the outer packing material, each film configuring the outer packing material may be disposed to directly contact to each other by means such as thermal welding, and may be disposed interposing a layer of an adhesive. Examples of the adhesive may include a polyester-based adhesive, a polyurethane-based adhesive, and an acrylic adhesive.

There are no particular limitations on the gas barrier properties of the outer packing material since it varies with the kind of the gas barrier film used therein; however, when the gas barrier film including the metal foil is used, the oxygen permeability after a bending test may be 0.10 cc/(m²·day·atm) or less. Thereby, the vacuum insulation material capable of maintaining excellent thermal insulation properties may be obtained. Also, when the gas barrier film including the resin substrate and the gas barrier layer is used, the oxygen permeability after a bending test may be 1.0 cc/(m²·day·atm) or less. Thereby, the vacuum insulation material capable of maintaining excellent thermal insulation properties may be obtained.

In the present disclosure, the bending test is a test based on ASTM F 392 in which three times of a bending treatment is carried out to a rectangular sample having a width of 210 mm by a length of 297 mm (A4 size) with a Gelvo type Flex-Cracking Tester. The Gelvo type Flex-Cracking Tester is preferably model name: BE1006 from TESTER SANGYO CO., LTD.

There are no particular limitations on the method for producing the outer packing material, and a known method may be used. Examples may include a method of bonding each film produced in advance with an adhesive, and a method in which the raw materials of each film heated and melted are sequentially extruded with a measure such as T-die to obtain a layered body.

B. Vacuum insulation material

The vacuum insulation material of the present disclosure is a vacuum insulation material comprising a core material, and an outer packing material for vacuum insulation material enclosing the core material; wherein the outer packing material for vacuum insulation material is the above described outer packing material for vacuum insulation material. The vacuum insulation material of the present disclosure is capable of maintaining excellent thermal insulation properties.

As the outer parking material for vacuum insulation material, the above described one may be used.

The core material is used to secure the space inside the vacuum insulation material where a vacuum state is kept. As the material for the main component of the core material, for example, a powder body, a porous body, and a fiber body may be used. Since the thermal conductivity of these is low, the thermal conduction by the core material may be inhibited. Specific examples may include fumed silica, porous urethane foam, glass wool, and glass fiber.

Inside the vacuum insulation material is kept in a vacuum state. There are no particular limitations on the vacuum degree inside; for example, it may be 5 Pa or less.

There are no particular limitations on the thermal conductivity of the vacuum insulation material; for example, it may be 15 mW/(m·K) or less, may be 10 mW/(m·K) or less, and may be 5 mW/(m·K) or less.

In the present disclosure, the measurement method used to measure the thermal conductivity is by a heat flow measurement method based on JIS A1412-2:1999 (method for measuring the thermal resistance and thermal conductivity of thermal insulation material-Section 2: Heat flow measurement method (HFM method), using a thermal conductivity measurement device, in the conditions of, the time required for steady state of test: 15 minutes or more, the kind of a standard plate: EPS, the temperature at a high temperature surface: 30° C., the temperature at a low temperature surface: 10° C., and the average temperature of a sample: 20° C., and the both of the main surfaces of the sample are placed to face up and down directions. The thermal conductivity measurement device is preferably Auto AHC-074 (from EKO Instruments). The size of the sample is, for example, 29±0.5 cm in the width, and 30±0.5 cm in the length. In one condition, at least 3 pieces of the sample are measured, and the average of these measured values is regarded as the value of the thermal conductivity in that condition.

There are no particular limitations on the method for producing the vacuum insulation material, and a known method may be used. For example, two pieces of the outer packing material cut in a tetragonal shape are prepared. The thermally weldable film in each of the two pieces of the outer packing material are faced to each other, overlapped, the three edges of the outer periphery are thermally welded to obtain a bag body of which one edge is open. After inserting a core material from the opening of the bag body, air is suck from the opening of the bag body. The one edge left is thermally welded in a state inside the bag body is decompressed. Thereby, a vacuum insulation material in which the core material is enclosed in the outer packing material may be obtained.

<Application>

The vacuum insulation material may be used in an article that requires thermal insulation.

C. Article Provided with Vacuum Insulation Material

The article provided with vacuum insulation material of the present disclosure is an article comprising an article including a thermal insulation region, and a vacuum insulation material; wherein the vacuum insulation material includes a core material, and an outer packing material for vacuum insulation material enclosing the core material; and the outer packing material for vacuum insulation material is the above described outer packing material for vacuum insulation material. The article provided with vacuum insulation material of the present disclosure is capable of maintaining excellent thermal insulation properties.

As the vacuum insulation material, the one described in the section "B. Vacuum insulation material" above may be used.

The thermal insulation region is a region thermally insulated by the vacuum insulation material; for example, it is a region kept warm or cool, a region surrounding a heat source and a cool source, and a region isolated from the heat source and the cool source. These regions may be a space and may be an article.

Examples of the article may include electronic devices such as a refrigerator, a freezer, a heat-keeping device, and a cool-keeping device, containers such as a heat-keeping container, a cool-keeping container, a container for transportation, a container, and a storing container, conveyance for transporting such as a vehicle, an airplane, and a vessel, and buildings such as a house and a storehouse.

EXAMPLE

The present disclosure is hereinafter explained in further details with reference to Examples below.

Films as follows were prepared.

(1) AL6: 6 μm thick aluminum foil (hereinafter described as "AL foil" in some cases) (Product name: BESPA from UACJ).

(2) VM-PET12: Gas barrier film including a resin substrate and a gas barrier film (Product name: VM-PET1510 from TORAY ADVANCED FILM CO., LTD.) of which tensile elasticity is 4.0 GPa, wherein a 12 μm thick biaxial stretched polyethylene terephthalate film includes an approximately 40 nm thick vapor-deposited aluminum layer (hereinafter described as "AL vapor deposited layer in some cases).

(3) LLDPE50: 50 μm thick unstretched linear short-chain branched polyethylene film (Product name: TUX-HCE from Mitsui Chemicals Tohcello. Inc.) of which tensile elasticity is 0.4 GPa.

(4) LLDPE30: 30 μm thick unstretched linear short-chain branched polyethylene film (Product name: TUX-HCE from Mitsui Chemicals Tohcello. Inc.) of which tensile elasticity is 0.4 GPa.

(5) HDPE50: 50 μm thick unstretched high-density polyethylene film (Product name: EF-HK from Dai Nippon Printing Co., Ltd.) of which tensile elasticity is 0.7 GPa.

(6) CPP50: 50 μm thick unstretched polypropylene film (Product name: CPP-SC from Mitsui Chemicals Tohcello. Inc.) of which tensile elasticity is 0.4 GPa.

(7) CPP30: 30 μm thick unstretched polypropylene film (Product name: CPP-SC from Mitsui Chemicals Tohcello. Inc.) of which tensile elasticity is 0.9 GPa.

(8) PBT50: 50 μm thick stretched polybutylene terephthalate film (Product name: HomoPBT from OG FILM CORPORATION) of which tensile elasticity is 1.7 GPa.

(9) PBT25: 25 μm thick stretched polybutylene terephthalate film (Product name: CTG25 from UNITIKA LTD.) of which tensile elasticity is 1.7 GPa.

(10) CPET30: 30 μm thick unstretched polyethylene terephthalate film of which tensile elasticity is 1.8 GPa, formed by extruding polyethylene terephthalate (Product name: SI-173 from TOYOBO CO., LTD.) with a T-die method.

(11) COP30: 30 μm thick cyclopolyolefin film (Product-name: Coxec ME-1 from KURABO INDUSTRIES LTD.) of which tensile elasticity is 1.7 GPa).

(12) PET50: 50 μm thick biaxial stretched polyethylene terephthalate film (Product name: Lumirror™S10 from Toray Industries, Inc.) of which tensile elasticity is 4.3 GPa.

(13) PET16: 16 μm thick biaxial stretched polyethylene terephthalate film (Product name: EMBLET™ PTMB from UNITIKA LTD.) of which tensile elasticity is 4.2 GPa.

(14) PET12: 12 μm thick biaxial stretched polyethylene terephthalate film (Product name: EMBLET™ PTMB from UNITIKA LTD.) of which tensile elasticity is 4.3 GPa.

(15) ON35: 35 μm thick biaxial stretched nylon film (Product name: EMBLEM™ ONBC from UNITIKA LTD.) of which tensile elasticity is 2.4 GPa.

(16) ON25: 25 μm thick biaxial stretched nylon film (Product name: EMBLEM™ ONBC from UNITIKA LTD.) of which tensile elasticity is 2.4 GPa.

Example 1

An outer packing material in which ON25 as a first protection film, PET12 as a second protection film, AL6 as a gas barrier film, PET12 as an intermediate film, and CPP50 as a thermally weldable film, were disposed in this order, was produced.

Each film was bonded with an adhesive having a thickness of approximately 4 μm (weight per unit area in the outer packing material was 3.5 g/m$^2$). As the adhesive, a thermosetting composition (A) in which a main agent of which main component was polyester polyol (Product name: AD-ROCK RU-77T from ROCK PAINT), a curing agent including aliphatic polyisocyanate (Product name: ROCK-BOND JH-7 from ROCK PAINT), and a solvent of ethyl acetate were mixed so as to be the main agent:the curing agent:the solvent=10:1:14 in the weight blending ratio, was thermally cured and used. Each of the main agent, the curing agent, and the solvent were kept separately before the usage, and mixed right before the usage.

In the production of the outer packing material, first, the thermosetting composition (A) was pasted to the protection film, and the dried to evaporate the solvent, and thus a layer of the adhesive was formed at one surface of the protection film. Next, the layer of the adhesive in the protection film and the gas barrier film were pressurized from both sides to bond the protection film and the gas barrier film with the adhesive. In the same procedures, the layer of the adhesive was formed to the gas barrier film and then the gas barrier film and the intermediate film were bonded, and also, the layer of the adhesive was formed to the intermediate film and then the intermediate film and the thermally weldable film were bonded. Lastly, an aging treatment was conducted to a layered body, in which each film was bonded with the adhesive, in a room at a temperature set to be approximately 40° C. (humidity was not controlled) for 3 days, and thereby the outer packing material was completed.

Incidentally, in all Examples and Comparative Examples, the thermally weldable film was bonded lastly. For example, when the gas barrier film including the metal foil was used, as described above, sequentially, the layer of the adhesive was formed to the film positioned at the outer side of the vacuum insulation material, and then the layer of the adhesive in the film positioned at the outer side and the film positioned in the inner side were bonded. On the other hand, when two or more pieces of the gas barrier film including the gas barrier layer and the resin substrate were used, the gas barrier layers of the gas barrier films were bonded and then the film positioned at the outer side, then the film positioned at the inner side were bonded in this order.

Example 2

An outer packing material was produced in the same procedures as in Example 1 except that PET12 as the protection film, AL6 as the gas barrier film, PET12 as the intermediate film, and CPP30 as the thermally weldable film were disposed in this order in the outer packing material.

Example 3

An outer packing material was produced in the same procedures as in Example 1 except that ON25 as the first protection film, PET12 as the second protection film, AL6 as the gas barrier film, and PBT50 as the thermally weldable film were disposed in this order in the outer packing material.

Example 4

An outer packing material was produced in the same procedures as in Example 1 except that PET12 as the protection film, AL6 as the gas barrier film, PET12 as the intermediate film, and PBT25 as the thermally weldable film were disposed in this order in the outer packing material.

Example 5

An outer packing material was produced in the same procedures as in Example 1 except that ON25 as the protection film, AL6 as the gas barrier film, and PBT25 as the thermally weldable film were disposed in this order in the outer packing material.

Example 6

An outer packing material was produced in the same procedures as in Example 1 except that PET16 as the protection film, AL6 as the gas barrier film, and PBT25 as the thermally weldable film were disposed in this order in the outer packing material.

Example 7

An outer packing material was produced in the same procedures as in Example 1 except that PET16 as the protection film, AL6 as the gas barrier film, and CPET30 as the thermally weldable film were disposed in this order in the outer packing material.

Example 8

An outer packing material was produced in the same procedures as in Example 1 except that PET16 as the protection film, AL6 as the gas barrier film, and COP30 as the thermally weldable film were disposed in this order in the outer packing material.

Comparative Example 1

An outer packing material was produced in the same procedures as in Example 1 except that ON35 as the first protection film, PET12 as the second protection film, AL6 as the gas barrier film, PET12 as the intermediate film, and CPP50 as the thermally weldable film were disposed in this order in the outer packing material.

Comparative Example 2

An outer packing material was produced in the same procedures as in Example 1 except that ON25 as the first protection film, PET12 as the second protection film, AL6 as the gas barrier film, and LLDPE50 as the thermally weldable film were disposed in this order in the outer packing material.

Comparative Example 3

An outer packing material was produced in the same procedures as in Example 1 except that ON25 as the first protection film, PET12 as the second protection film, AL6 as the gas barrier film, and HDPE50 as the thermally weldable film were disposed in this order in the outer packing material.

Comparative Example 4

An outer packing material was produced in the same procedures as in Example 1 except that ON25 as the protection film, AL6 as the gas barrier film, and LLDPE50 as the thermally weldable film were disposed in this order in the outer packing material.

Comparative Example 5

An outer packing material was produced in the same procedures as in Example 1 except that ON25 as the protection film, AL6 as the gas barrier film, and LLDPE30 as the thermally weldable film were disposed in this order in the outer packing material.

Example 9

An outer packing material was produced in the same procedures as in Example 1 except that ON25 as the protection film, VM-PET12 as a first gas barrier film, VM-PET12 as a second gas barrier film, and CPP30 as the thermally weldable film were disposed in this order in the outer packing material. Incidentally, 2 pieces of the VM-PET12 were bonded with the adhesive in the manner that the AL vapor deposited layers were bonded so that 2 pieces of the AL deposited layers were disposed between the resin substrate of one VM-PET12 and the resin substrate of the other VM-PET12.

Example 10

An outer packing material was produced in the same procedures as in Example 9 except that ON25 as the protection film, VM-PET12 as the first gas barrier film, VM-PET12 as the second gas barrier film, and PBT25 as the thermally weldable film were disposed in this order in the outer packing material.

Comparative Example 6

An outer packing material was produced in the same procedures as in Example 9 except that PET50 as the protection film, VM-PET12 as the first gas barrier film, VM-PET12 as the second gas barrier film, and PBT25 as the thermally weldable film were disposed in this order in the outer packing material.

Comparative Example 7

An outer packing material was produced in the same procedures as in Example 9 except that ON25 as the protection film, VM-PET12 as the first gas barrier film, VM-PET12 as the second gas barrier film, and LLDPE30 as the thermally weldable film were disposed in this order in the outer packing material.

Evaluations as below were carried out for the outer packing materials obtained in Examples and Comparative Examples.

(1) Function M

The tensile elasticity and the thickness of the outer packing materials obtained in Examples and Comparative Examples were measured and the value of function M was calculated. The results are shown in Table 1 below. Incidentally, the tensile elasticity was measured in the above described method, and the average value in surface (the average value of the values collected in 8 conditions where the condition of the direction in the surface of the outer packing material was changed in approximately every 22.5°) was used.

(2) Push-in Elasticity of Thermally Weldable Film

The push-in elasticity of the thermally weldable films in the outer packing materials obtained in Examples and Comparative Examples was measured in the above described method. The results are shown in Table 1 below.

(3) Oxygen Permeability after Bending Test

A bending test was carried out for the outer packing materials obtained in Examples and Comparative Examples in the above described method, and then the oxygen permeability was measured in the above described method. The results are shown in Table 1 below.

[Evaluation Results]

TABLE 1

| | Kind of Gas barrier film | Film structure in outer packing material | Tensile Elasticity GPa | Thick μm | Function M MPa · mm$^3$ | Push-in Elasticity of Thermally Weldable film GPa | Oxygen permeability after bending test cc/(m$^2$ · day · atm) |
|---|---|---|---|---|---|---|---|
| Example 1 | AL foil | ON25/PET12/AL6/PET12/CPP50 | 1.9 | 114 | 2.8 | 0.9 | 0.06 |
| Example 2 | AL foil | PET12/AL6/PET12/CPP30 | 2.2 | 69 | 0.7 | 0.9 | 0.05 |
| Example 3 | AL foil | ON25/PET12/AL6/PBT50 | 1.9 | 102 | 2.0 | 1.7 | 0.03 |
| Example 4 | AL foil | PET12/AL6/PET12/PBT25 | 3.2 | 64 | 0.8 | 2.1 | 0.02 |
| Example 5 | AL foil | ON25/AL6/PBT25 | 3.3 | 65 | 0.9 | 2.1 | 0.03 |
| Example 6 | AL foil | PET16/AL6/PBT25 | 3.3 | 56 | 0.6 | 2.1 | 0.02 |
| Example 7 | AL foil | PET16/AL6/CPET30 | 3.2 | 61 | 0.7 | 2.2 | 0.02 |
| Example 8 | AL foil | PET16/AL6/COP30 | 3.1 | 61 | 0.7 | 2.7 | 0.02 |
| Comp. Example 1 | AL foil | ON35/PET12/AL6/PET12/CPP50 | 1.7 | 124 | 3.2 | 0.9 | 0.12 |
| Comp. Example 2 | AL foil | ON25/PET12/AL6/LLDPE50 | 1.8 | 102 | 1.9 | 0.6 | 0.17 |
| Comp. Example 3 | AL foil | ON25/PET12/AL6/HDPE50 | 1.8 | 102 | 1.9 | 0.5 | 0.14 |
| Comp. Example 4 | AL foil | ON25/AL6/LLDPE50 | 1.9 | 90 | 1.4 | 0.6 | 0.19 |
| Comp. Example 5 | AL foil | ON25/AL6/LLDPE30 | 2.4 | 70 | 0.8 | 0.6 | 0.11 |
| Example 9 | AL vapor deposited layer | ON25/VM-PET12/VM-PET12/CPP30 | 2.2 | 88 | 1.5 | 0.9 | 0.58 |
| Example 10 | AL vapor deposited layer | ON25/VM-PET12/VM-PET12/PBT25 | 2.5 | 83 | 1.4 | 2.1 | 0.42 |
| Comp. Example 6 | AL vapor deposited layer | PET50/VM-PET12/VM-PET12/PBT25 | 3.3 | 108 | 4.2 | 2.1 | 1.97 |
| Comp. Example 7 | AL vapor deposited layer | ON25/VVM-PET12/VM-PET12/LLDPE30 | 2.0 | 88 | 1.4 | 0.6 | 1.03 |

From Table 1, in Examples 1 to 10 of which value of function M was 3.0 MPa·mm³ or less, the oxygen permeability after the bending test was low and the durability of gas barrier properties was high. On the other hand, in Comparative Examples 1 and 6 of which value of function M exceeded 3.0 MPa·mm³, the oxygen permeability after the bending test was high and the durability of gas barrier properties was low.

Also, from Table 1, in Examples 1 to 10 of which push-in elasticity of thermally weldable film was 0.8 GPa or more, the oxygen permeability after the bending test was low and the durability of gas barrier properties was high. On the other hand, in Comparative Examples 2 to 5 and 7 of which push-in elasticity of the thermally weldable film was less than 0.8 GPa, the oxygen permeability after the bending test was high and the durability of gas barrier properties was low.

From the above, it is considered that, in the outer packing material of which value of function M is 3.0 MPa·mm³ or less as well as push-in elasticity of the thermally weldable film is 0.8 GPa or more, the oxygen permeability after the bending test is low. With the outer packing material of which low oxygen permeability after the bending test is low, a vacuum insulation material capable of maintaining excellent thermal insulation properties can be produced.

Further, in Examples 3 to 8 of which push-in elasticity of the thermally weldable film was 1.3 GPa or more, the oxygen permeability after the bending test was lower than that in Examples 1 to 2 of which push-in elasticity of the thermally weldable film was less than 1.3 GPa. Accordingly, a vacuum insulation material capable of maintaining more excellent thermal insulation properties can be produced by setting the push-in elasticity of the thermally weldable film to be 1.3 GPa or more.

REFERENCE SIGNS LIST

1 . . . thermally weldable film
2 . . . gas barrier film
3 . . . protection film
4 . . . adhesive
5 . . . intermediate film
10 . . . outer packing material for vacuum insulation material
11 . . . core material
20 . . . vacuum insulation material

The invention claimed is:

1. An outer packing material for vacuum insulation material comprising a thermally weldable film and a gas barrier film in this order; wherein
a product of a tensile elasticity of the outer packing material for vacuum insulation material and a cube of a thickness of the outer packing material for vacuum insulation material is 3.0 MPa·mm³ or less; and
a push-in elasticity of the thermally weldable film is 0.8 GPa or more.

2. The outer packing material for vacuum insulation material according to claim 1, wherein the push-in elasticity of the thermally weldable film is 1.3 GPa or more.

3. The outer packing material for vacuum insulation material according to claim 1, wherein the product of the tensile elasticity of the outer packing material for vacuum insulation material and the cube of a thickness of the outer packing material for vacuum insulation material is 1.0 MPa·mm³ or more.

4. The outer packing material for vacuum insulation material according to claim 1, wherein the gas barrier film includes a metal foil.

5. The outer packing material for vacuum insulation material according to claim 1, wherein the gas barrier film includes a resin substrate and a gas barrier layer containing an inorganic compound disposed at one or both surface of the resin substrate.

6. The outer packing material for vacuum insulation material according to claim 1, further comprising a protection film at the opposite side surface to the thermally weldable film of the gas barrier film.

7. The outer packing material for vacuum insulation material according to claim 1, further comprising an intermediate film between the gas barrier film and the thermally weldable film.

8. A vacuum insulation material characterized by comprising a core material, and an outer packing material for vacuum insulation material enclosing the core material; wherein
the outer packing material for vacuum insulation material is the outer packing material for vacuum insulation material according to claim 1.

9. An article provided with vacuum insulation material comprising an article including a thermal insulation region, and a vacuum insulation material; wherein
the vacuum insulation material includes a core material, and an outer packing material for vacuum insulation material enclosing the core material; and
the outer packing material for vacuum insulation material is the outer packing material for vacuum insulation material according to claim 1.

10. The outer packing material for vacuum insulation material according to claim 1, wherein a tensile elasticity of the outer packaging material is 1.2 GPa or more.

* * * * *